(12) United States Patent
Benjamin et al.

(10) Patent No.: US 9,175,711 B2
(45) Date of Patent: *Nov. 3, 2015

(54) THREAD LOAD DISTRIBUTION

(71) Applicant: United Technologies Corporation, Hartford, CT (US)

(72) Inventors: Daniel Benjamin, Simsbury, CT (US); Kaliya Balamurugan, Newington, CT (US); Daniel R. Kapszukiewicz, Plainfield, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/459,734

(22) Filed: Aug. 14, 2014

(65) Prior Publication Data
US 2014/0356099 A1 Dec. 4, 2014

Related U.S. Application Data

(62) Division of application No. 13/437,112, filed on Apr. 2, 2012, now Pat. No. 8,882,425.

(51) Int. Cl.
*F16B 33/00* (2006.01)
*F16B 33/02* (2006.01)
*F01D 5/06* (2006.01)

(52) U.S. Cl.
CPC . *F16B 33/02* (2013.01); *F01D 5/06* (2013.01); *F05D 2250/281* (2013.01)

(58) Field of Classification Search
CPC ...................................................... F16B 33/00
USPC ............... 411/263–265, 309, 310, 366.1, 938
See application file for complete search history.

(56) References Cited

U.S. PATENT DOCUMENTS 1,870,380 A 8/1932 Peters et al.
2,349,651 A 5/1944 Davis
(Continued)

FOREIGN PATENT DOCUMENTS

EP 0503964 9/1992
EP 1591623 11/2005

OTHER PUBLICATIONS

International Search Report & Written Opinion for International Application No. PCT/US2013/033973 completed on Jan. 15, 2014.
(Continued)

*Primary Examiner* — Roberta DeLisle
(74) *Attorney, Agent, or Firm* — Carlson, Gaskey & Olds, P.C.

(57) ABSTRACT

A fastener arrangement has first and second threaded members. The fastener arrangement includes the first threaded member having threads that extend from a first end to a second end. The threads have a thread contour that is provided by load and clearance flank surfaces that are joined to one another by crests and roots. The crest provides a crest diameter. A root provides a root diameter and is arranged between adjoining threads. At least one thread near the first end has a weakened thread contour that decreases rigidity of the one thread compared to other threads. The threads extend along an axis. The crest diameter of the second threaded member varies and lies along crest angle relative to the axis and comprises a second threaded member that has load flank surfaces that are engaging the load flank surfaces of the first threaded member at thread contact interfaces. The thread contact interfaces are smaller towards the second end than thread contact interfaces toward the first end.

4 Claims, 2 Drawing Sheets

(56) References Cited

U.S. PATENT DOCUMENTS

| | | |
|---|---|---|
| 2,772,102 A | 11/1956 | Webb |
| 3,205,756 A | 9/1965 | Ollis, Jr. et al. |
| 3,266,363 A | 8/1966 | Bronson et al. |
| 4,549,754 A | 10/1985 | Saunders et al. |
| 5,123,793 A | 6/1992 | Bonstein |
| 5,537,814 A | 7/1996 | Nastuk et al. |
| 5,779,416 A | 7/1998 | Sternitzky |
| 5,782,078 A | 7/1998 | Brantley |
| 6,381,827 B1 | 5/2002 | Steinbock |
| 6,848,724 B2 | 2/2005 | Kessler |
| 7,731,466 B2 | 6/2010 | Shea et al. |
| 7,761,991 B2 | 7/2010 | Walter et al. |
| 7,997,842 B2 | 8/2011 | Diekmeyer |
| 2010/0329776 A1 | 12/2010 | Durling |
| 2011/0146298 A1 | 6/2011 | Reinhardt et al. |

OTHER PUBLICATIONS

International Preliminary Report on Patentability for PCT Application No. PCT/US2013/033973, mailed Oct. 16, 2014.

THREAD LOAD DISTRIBUTION

CROSS-REFERENCE TO RELATED APPLICATIONS

This disclosure is a divisional of U.S. patent application Ser. No. 13/437,112 filed Apr. 2, 2012.

BACKGROUND

This disclosure relates to a gas turbine engine including, for example, compressor and turbine rotors assembled using a tie shaft connection.

Gas turbine engines include a compressor that compresses air and delivers it downstream to a combustion section. The air is mixed with fuel in the combustion section and combusted. Products of this combustion pass downstream over turbine rotors, causing the turbine rotors to rotate.

In one example arrangement, the compressor section is provided with a plurality of rotor stages, or rotor sections, arranged in a stack. Traditionally, these stages have been joined sequentially, one to another, into an inseparable assembly by welding, or into a separable assembly by bolting using bolt flanges, or other structure to receive the attachment bolts. Another joining approach uses a tie shaft and threaded member that cooperate with one another to clamp the rotor sections to one another.

The threaded member has a tendency to lift off of, or flare outward from, the tie shaft. This typically occurs at the base of the threaded member near where the axial load is applied to the stack. Lift off is due to the uneven axial loading of the threads. One solution has been to use a differing thread pitch between the tie shaft and the threaded member to achieve more even thread loading.

SUMMARY

In one exemplary embodiment, a fastener arrangement has first and second threaded members. The fastener arrangement includes the first threaded member having threads that extend from a first end to a second end. The threads have a thread contour that is provided by load and clearance flank surfaces that are joined to one another by crests and roots. The crest provides a crest diameter. A root provides a root diameter and is arranged between adjoining threads. At least one thread near the first end has a weakened thread contour that decreases rigidity of the one thread compared to other threads. The threads extend along an axis. The crest diameter of the second threaded member varies and lies along crest angle relative to the axis and comprises a second threaded member that has load flank surfaces that are engaging the load flank surfaces of the first threaded member at thread contact interfaces. The thread contact interfaces are smaller towards the second end than thread contact interfaces toward the first end.

In a further embodiment of the above, the threads include a constant pitch.

In a further embodiment of any of the above, a second threaded member is secured to the first threaded member. The second threaded member has the same pitch as the first threaded member.

In a further embodiment of any of the above, the threads extend along an axis. The load flank surfaces are inclined about the normal to an axis of the first threaded member. The clearance flank surfaces are generally parallel to one another.

The second threaded member has load flank surfaces that engage the corresponding load flank surfaces of the mating first threaded member.

BRIEF DESCRIPTION OF THE DRAWINGS

The disclosure can be further understood by reference to the following detailed description when considered in connection with the accompanying drawings wherein.

DETAILED DESCRIPTION

Figure 1:
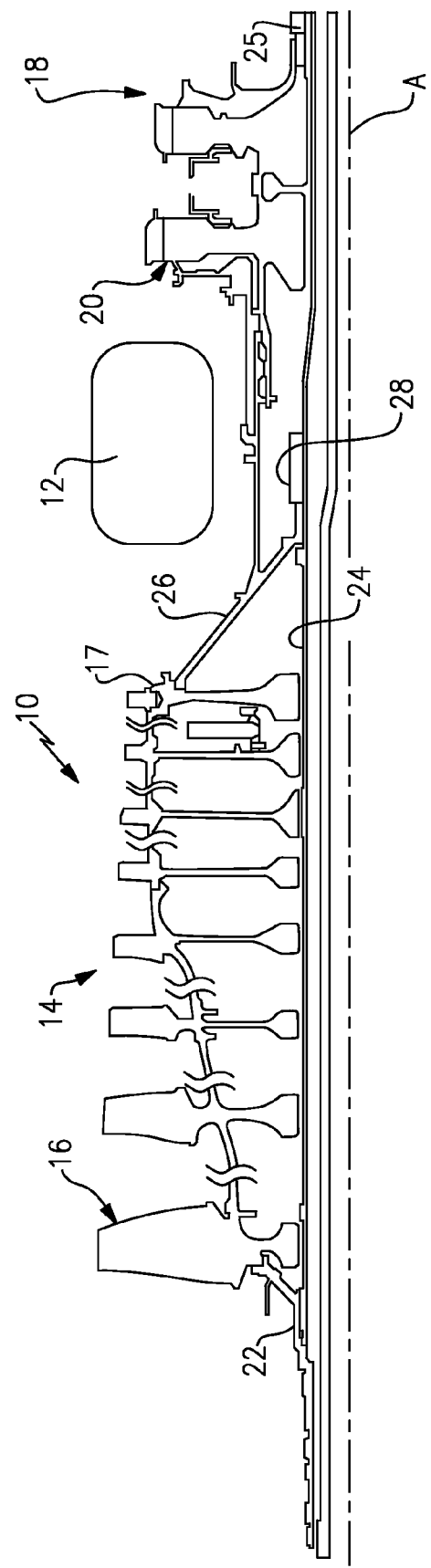
FIG. 1 is a cross-sectional view of a portion of an example gas turbine engine having a tie shaft.

FIG. 1 schematically shows an exemplary section of a gas turbine engine 10, in particular a high pressure spool, incorporating a combustion section 12, shown schematically. A compressor section 14 includes multiple compressor rotors 16 arranged to provide a compressor stack. A turbine section 18 has multiple turbine rotors 20 providing a turbine stack. The compressor and turbine rotors 16, 20 respectively support airfoils that are either integral or separately attached. As shown, an upstream hub 22 has a threaded engagement with a tie shaft 24 upstream of the compressor rotors 16. There may be a low pressure compressor and a fan section to the left (or upstream) of the upstream hub 22 in the orientation illustrated.

An upstream hub 22 is positioned at the upstream end of the compressor stack, while a downstream hub 26 is positioned at a downstream side of the compressor stack, and engages a downstream-most compressor rotor 17. The stack of compressor rotors is thus sandwiched between the upstream and downstream hubs 22, 26, clamped by tie shaft 24 and secured by a mid nut, or mid abutment member, 28. Downstream hub 26 abuts the turbine stack in the example shown. The turbine stack is sandwiched between the downstream hub 26 and a turbine nut 25. The upstream hub 22 and nuts have internal threads that cooperate with external threads provided on the tie shaft 24.

It is desirable to evenly distribute the axial load on the threads to reduce stress on the threads and prevent lift off. To this end, a fastener arrangement is provided with threads, some of which include a weakened thread contour that decreases rigidity of at least one thread compared to other threads thereby enabling axial loads to be distributed more evenly between the threads.

Figure 2:
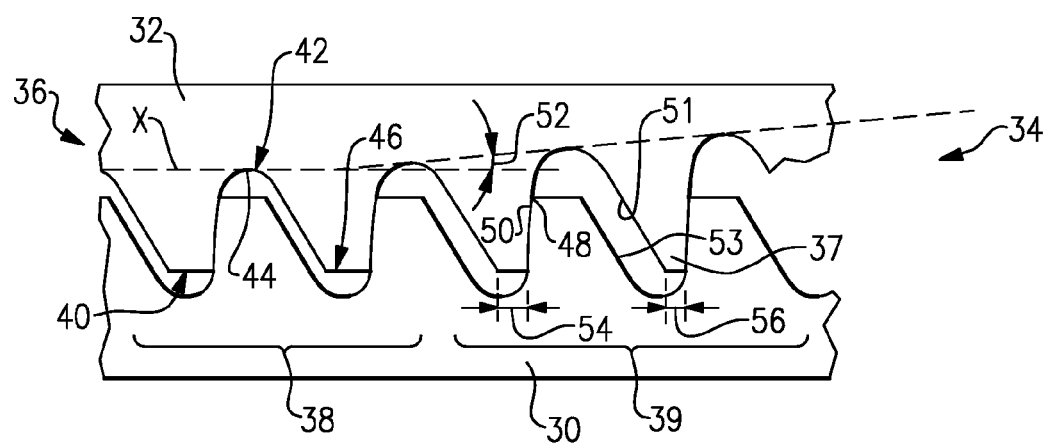
FIG. 2 is a schematic illustration of one arrangement of first and second threaded members that promote relatively uniform thread loading.

One example fastener arrangement for the threaded tie shaft interfaces is illustrated in FIG. 2. Load and clearance flank orientation is dependent on the direction of the load and can be a minor image of the one shown. The fastener arrangement includes first and second threaded members 30, 32. In one example, the first threaded member 30 is male, and the second threaded member 32 is female. The second threaded member 32 has the same pitch as the first threaded member 30 in one example. The second threaded member 32 includes threads that extend in an axial direction X between first and second ends 34, 36.

The second threaded member 32 has a thread contour provided by a load flank surface 48 and clearance flank surface 51 joined to one another by a crest 46 and root 44. The first threaded member 30 has threads with load flank surfaces 50 that engage the load flank surfaces 48 of the second threaded member 32. In the example, the load flank surfaces 48, 50 are inclined about the normal to the axis X, and the clearance flank surfaces 51, 53 are generally parallel to one another. The threads at the first end 36 see the greatest share of the total axial load along the contact on the mating load flanks 48, 50, and the following threads between first and second ends 34, 36 will see progressively a lesser share of the total axial load.

The crest 46 of the second threaded member provides a minor diameter 40, which is generically referred to as a "crest diameter." A root 44 provides a major diameter 42, which is generically referred to as a "root diameter," and is arranged between adjoining threads. At least one thread near the first end 34 has a weakened thread contour that decreases rigidity of the one thread compared to the first thread, enabling axial loads to be transferred to the following threads thus distributing the axial load more evenly between the threads.

The threads of the second threaded member 32 provide first and second portions 38, 39 that are distinct from one another. The threads have a constant minor diameter 40. The major diameter 42 of the first portion 38 is constant. The major diameter of the second portion 39 increases in a direction away from the first portion 38 towards the first end 34. Furthermore, the gap between clearance flank surfaces 51 of the first and second threaded members 30, 32 increases towards the first end 34. The second threaded portion 39 includes root depths that increase and taper at a root angle 52, which is approximately 3 degrees, for example. During manufacture, the cutting tool that forms the threads is advanced radially at a constant rate along the second threaded portion 39 to increase the root depths. Since the root depths increase and the pitch is constant, the crests 54, 56 of the second threaded portion 39 decrease toward the second end 34. That is, the crest 56 is smaller than the crest 54. The varying major diameter provides increasingly thinner teeth that are weaker and more flexible thereby imparting higher stresses on the threads closer to second end 34 while decreasing the stress on threads at the first end 36 which typically have the highest stress.

Figure 3:
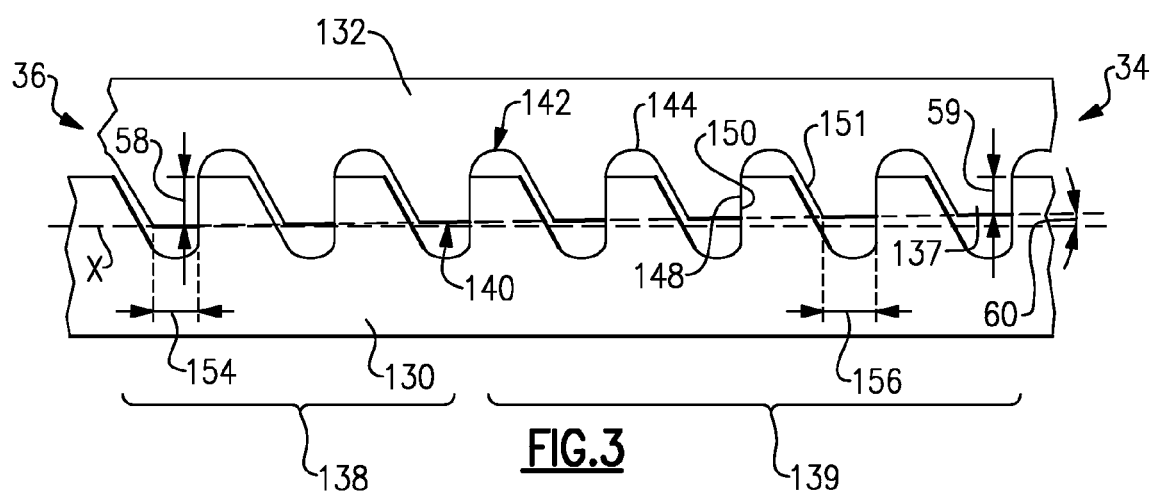
FIG. 3 is a schematic illustration of another arrangement of first and second threaded members that promote relatively uniform thread loading.

Referring to FIG. 3, the second threaded member's 132 threads extend along the axis X and include roots 144 and clearance flank surfaces 151. Load and clearance flank orientation is dependent on the direction of the load and can be a mirror image of the one shown. The second threaded member's minor diameter 140, or crest diameter, of the second member 132 is constant over first portion 138 and varies and lies along a crest angle 60 relative to the axis X over the second portion 139. The first threaded member's 130 crest and root diameters are parallel to axis X for the entire length of the joint. The crests 154, 156 of the second threaded member's threads are arranged on the crest angle 60. The first and second threaded members 130, 132 have load flank surfaces 148, 150 engaging one another at thread contact interfaces 58. The thread contact interfaces 59 become increasingly smaller at the second end 34 than other thread contact interfaces 58. As a result, the crests 154, 156 increase toward the second end 34. The crest 156 is larger than the crest 154. Progressively radially shorter threads are provided, which imparts higher stresses on the threads closer to second end 34 while decreasing the stress on threads at the first end 36, enabling axial loads to be distributed more evenly between the threads.

The second threaded member's major diameter 142, or root diameter, is constant, and the first and second threaded members 130, 132 include the same pitches, which are constant. During manufacture, the cutting tool for the second threaded member's 132 root diameter is advanced radially at a constant rate, for example, to create the crest angle 60, although other machining strategies may be used.

Although an example embodiment has been disclosed, a worker of ordinary skill in this art would recognize that certain modifications would come within the scope of the claims. For example, the first and second threaded members can be used for applications other than tie shafts or gas turbine engines. The root and crest modifications discussed relative to the second member may also be used for the first member. The thread form can also be different from the buttress thread form shown in FIG. 2 and FIG. 3. For that and other reasons, the following claims should be studied to determine their true scope and content.

What is claimed is:

1. A fastener arrangement having first and second threaded members, the fastener arrangement comprising:
   the first threaded member having threads extending from a first end to a second end, the threads having a thread contour provided by load and clearance flank surfaces joined to one another by crests and roots, the crest providing a crest diameter, and a root providing a root diameter and arranged between adjoining threads, wherein at least one thread near the first end has a weakened thread contour decreasing rigidity of the one thread compared to other threads, wherein the threads extend along an axis, and the crest diameter of the second threaded member varies and lies along crest angle relative to the axis, comprising a second threaded member having load flank surfaces engaging the load flank surfaces of the first threaded member at thread contact interfaces, the thread contact interfaces smaller towards the second end than thread contact interfaces toward the first end.

2. The fastener arrangement according to claim 1, wherein the threads include a constant pitch.

3. The fastener arrangement according to claim 2, comprising a second threaded member secured to the first threaded member, the second threaded member having the same pitch as the first threaded member.

4. The fastener arrangement according to claim 3, wherein the threads extend along an axis, and the load flank surfaces are inclined about the normal to an axis of the first threaded member, and the clearance flank surfaces are generally parallel to one another, the second threaded member having load flank surfaces engaging the corresponding load flank surfaces of the mating first threaded member.

* * * * *